(12) United States Patent
Shane et al.

(10) Patent No.: US 12,457,704 B2
(45) Date of Patent: Oct. 28, 2025

(54) VENTED SENSOR POD SYSTEMS AND METHODS

(71) Applicant: Kodiak Robotics, Inc., Mountain View, CA (US)

(72) Inventors: Laura Weeks Shane, San Mateo, CA (US); Jay Kuvelker, San Francisco, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 524 days.

(21) Appl. No.: 17/883,279

(22) Filed: Aug. 8, 2022

(65) Prior Publication Data

US 2024/0049423 A1    Feb. 8, 2024

(51) Int. Cl.
| | | |
|---|---|---|
| *H05K 7/20* | (2006.01) | |
| *B60R 11/04* | (2006.01) | |
| *G01S 7/02* | (2006.01) | |
| *G01S 7/481* | (2006.01) | |
| *H04N 23/52* | (2023.01) | |
| *G01S 13/931* | (2020.01) | |
| *G01S 17/931* | (2020.01) | |

(52) U.S. Cl.
CPC .......... *H05K 7/20209* (2013.01); *B60R 11/04* (2013.01); *G01S 7/027* (2021.05); *G01S 7/4813* (2013.01); *H04N 23/52* (2023.01); *H05K 7/20845* (2013.01); *G01S 13/931* (2013.01); *G01S 2013/93274* (2020.01); *G01S 17/931* (2020.01)

(58) Field of Classification Search
CPC ..................... H05K 7/20209; H05K 7/20845
See application file for complete search history.

(56) References Cited

U.S. PATENT DOCUMENTS

| | | | | |
|---|---|---|---|---|
| 2020/0390001 A1* | 12/2020 | Diehl | ...................... | B60R 11/04 |
| 2021/0003669 A1* | 1/2021 | Diehl | ..................... | G01S 17/931 |
| 2021/0063093 A1* | 3/2021 | Tobiassen | ............... | G01S 17/88 |
| 2021/0339710 A1* | 11/2021 | Adams | .................. | G01S 15/931 |
| 2022/0034690 A1* | 2/2022 | Surineedi | .............. | G01S 17/931 |
| 2022/0283270 A1* | 9/2022 | Lee | .................... | H05K 7/20863 |
| 2023/0119975 A1* | 4/2023 | Diehl | ...................... | G01S 17/87 |
| | | | | 701/28 |

FOREIGN PATENT DOCUMENTS

WO    2020/180707 A    9/2020

OTHER PUBLICATIONS

U.S. Appl. No. 17/826,000, filed May 26, 2022 [Available in IFW].
U.S. Appl. No. 17/883,397, filed Aug. 8, 2022 [Available in IFW].

* cited by examiner

*Primary Examiner* — Ko-Wei Lin
(74) *Attorney, Agent, or Firm* — Michele V. Frank; Venable LLP

(57) ABSTRACT

A method of regulating a temperature of a sensor pod on an autonomous vehicle includes determining a temperature of the sensor pod, determining an amount a vent should be opened based upon the operational status of the autonomous vehicle, an internal temperature of the sensor pod, and ambient temperature of the environment, opening a vent when the temperature is above a predetermined threshold temperature, and closing the vent when the temperature is below the predetermined threshold temperature.

21 Claims, 7 Drawing Sheets

VENTED SENSOR POD SYSTEMS AND METHODS

CROSS REFERENCE TO RELATED APPLICATIONS

The present application is related to co-pending U.S. application Ser. No. 17/883,397, filed Aug. 8, 2022, the entire contents of which are hereby incorporated by reference in its entirety.

TECHNICAL FIELD

The present disclosure relates to a vented sensor pod systems and methods.

BACKGROUND

Vehicles include side mirrors connected to the vehicle. Some side mirrors may be equipped to gather data and information, communicate with the vehicle, and may assist in navigating the vehicle.

BRIEF SUMMARY

According to an embodiment, a method of regulating a temperature of a sensor pod on an autonomous vehicle includes determining a temperature of the sensor pod, determining an amount a vent should be opened based upon the operational status of the autonomous vehicle, an internal temperature of the sensor pod, and ambient temperature of the environment, opening a vent when the temperature is above a predetermined threshold temperature, and closing the vent when the temperature is below the predetermined threshold temperature.

According to an embodiment, a method of clearing an occlusion from a sensor pod includes generating heat within the sensor pod, trapping the heat within the sensor pod, and clearing the occlusion from the sensor pod with the trapped heat.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
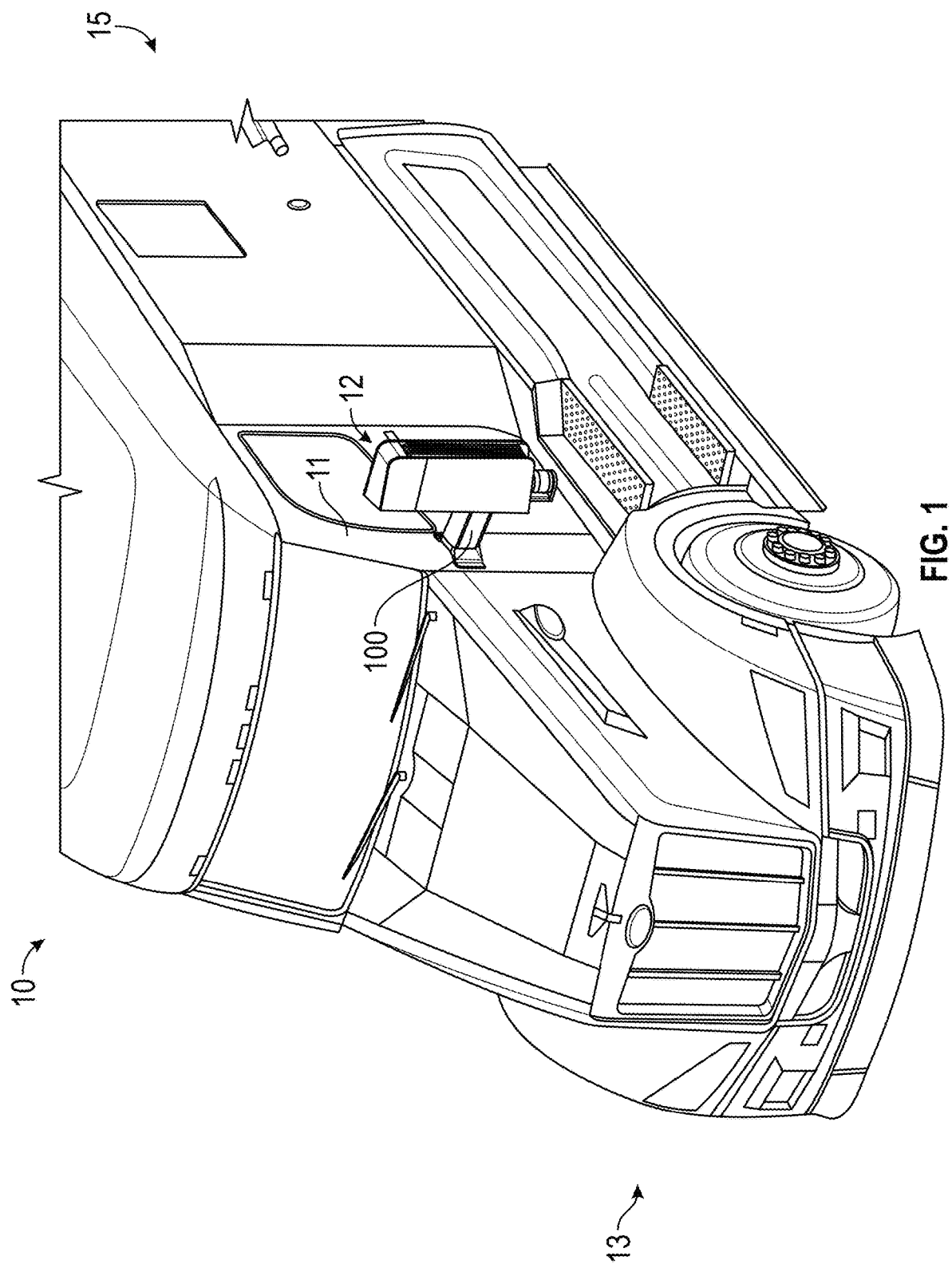
FIG. 1 illustrates a perspective view of a vehicle, according to an embodiment of the present disclosure.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," and "third" may be used interchangeably to distinguish one component from another and are not intended to signify location or importance of the individual components.

The terms "forward" and "rearward" refer to relative positions of a vehicle. For example, forward refers to a position closer to front hood, front bumper, or front fender of the vehicle and rearward refers to a position closer to a rear bumper, rear trunk, or trailer of the vehicle.

The terms "upper," "lower," "left," and "right" refer to relative positions of a sensor pod with respect to a ground surface, as viewed from a position forward of the sensor pod. For example, "upper" refers to a position vertically above a "lower" position. For example, "left" refers to a position laterally to the left of a "right" position.

The term "side" as used herein may refer to a surface, wall, edge, border, boundary, etc., or simply to a general position or location with respect to the described component (e.g., not referring to any physical component).

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a one, two, four, ten, fifteen, or twenty percent margin in either individual values, range(s) of values and/or endpoints defining range(s) of values.

Vehicles include sensor pods connected to the vehicle. The sensor pods gather data and information, communicate with the vehicle, and may assist in navigating the vehicle. The sensor pods include a variety of sensors, cameras, and mirrors to gather the data and information, communicate with the vehicle, and where applicable, assist in navigating the vehicle. Additional components are included to complement the sensors, cameras, and mirrors, such as, for example, one or more conduits for providing air and/or water to the sensors and/or cameras to assist in operation and/or cleaning of the sensors and/or cameras, and one or more conduits for providing power and for allowing two-way communication with the sensors, cameras, and mirrors.

The sensors, cameras, and the additional components may generate heat. The heat may build up within a housing of the senor pod.

Furthermore, some weather conditions, such as, for example, but not limited to, ice, snow, and/or fog, or the like, may interfere with the operation of the sensor pod. In some examples, the interference may be an occlusion, either partially or fully, of one or more sensors of the sensor pod. For example, the ice, snow, and/or fog may accumulate on one or more surfaces of the sensor pod. The weather conditions may interfere with the operation of the sensors, cameras, and/or mirrors. For example, snow, ice, and fog may obscure the visibility of cameras, sensors, and/or mirrors, may occlude the field of view of the cameras, sensors, and/or mirrors, may interfere with radar or other signals from the sensors, may block or interfere with a laser of the lidar, etc.

There remains a need for improved assemblies, systems, and methods for addressing the heat generated by the components within the sensor pod and for addressing weather conditions that may interfere with operation of the sensor pod. As described and shown herein, the improved assemblies, systems, and methods may include, for example, but not limited to, including providing a vent on a sensor pod housing, controlling the vent to open and close based on predetermined conditions or parameters, and including passive or active actuators to perform the opening and closing of the vent.

Figure 2:
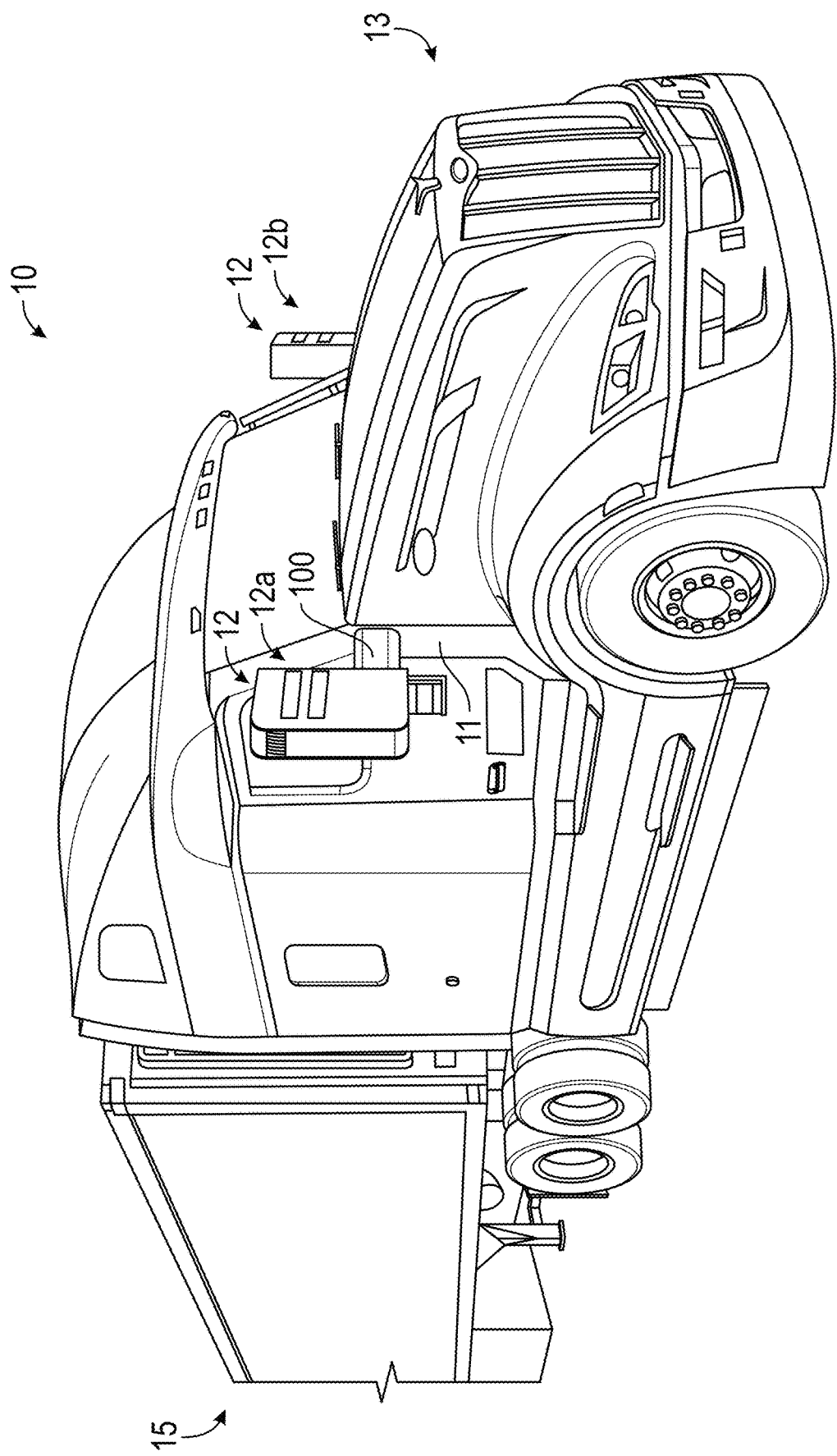
FIG. 2 illustrates a perspective view of another vehicle, according to an embodiment of the present disclosure.

FIGS. 1 and 2 illustrate a vehicle 10 having a sensor pod 12. Although a single sensor pod 12 is illustrated in FIG. 1 and two sensor pods 12 are illustrated in FIG. 2 (e.g., a passenger side sensor pod 12a and a driver side sensor pod 12b), more or fewer may be provided. The sensor pod 12 of FIGS. 1 and 2 may be any of the sensor pods described herein, including the sensor pods described with respect to FIGS. 3 to 6. The vehicle 10 may be any motor vehicle, such as, for example, but not limited to a car, a truck, a commercial truck, a bus, a watercraft (e.g., boat, ship, underwater vehicles, etc.), a motorcycle, an aircraft (e.g., airplane, helicopter, etc.), or a spacecraft. For ease of description, the vehicle 10 may be referred to herein as a truck 10. The vehicle may have a forward side 13, also referred to as a forward end or a front end, and a rear side 15, also referred to as a rear end, rearward end, or rearward side.

With continued reference to FIGS. 1 and 2, the sensor pod 12 may be a side mirror assembly mounted to the vehicle 10. The sensor pod 12 may assist in navigation of the vehicle 10. In some examples, the sensor pod 12 may assist in navigation in a manner that results in the vehicle 10 being autonomous, self-driving, semi-autonomous, non-autonomous with assisted navigation, etc., or combinations thereof. In this regard, the sensor pod 12 may include components, such as, but not limited to, sensors and mirrors, that may be useful for the operation of the vehicle, or any combination thereof. The vehicle 10 may use (via a processor or controller) data collected by the sensor pod 12 to navigate or to assist in navigating the vehicle 10 and to control the speed, direction, braking, and other functions of the vehicle 10. By way of example, the sensor pod 12 may be, or may include the sensors, cameras, mirrors, and associated components of, the sensor pod described in International Patent Application Publication No. WO 2020/180707, the contents of which are herein incorporated by reference in their entirety. Although illustrated as mounted to the A-pillar 11 of the frame of the vehicle 10 near the driver side and passenger side doors, the sensor pod 12 may be mounted to other locations on the vehicle 10, such as, for example, but not limited to, driver side and/or passenger side doors or other locations on the frame of the vehicle 10. The mounting site of the sensor pod 12 may preferably use existing mounting points for the truck 10, or may mount with appropriate hardware to the truck structure. The sensor pod 12 may be connected or coupled to the vehicle 10 with a connecting assembly 100. The sensor pod 12 and/or the connecting assembly 100 may be the same as the sensor pod and connecting assembly described in U.S. application Ser. No. 17/826,000, the contents of which are herein incorporated by reference in their entirety.

As will be described in more detail to follow, and as described in International Patent Application Publication No. WO 2020/180707, the sensor pod 12 includes a variety of sensors to monitor the surroundings of the vehicle 10. The sensors may include, for example, but not limited to, one or more cameras, one or more lidars, one or more radars, and one or more inertial measurement units (IMUs). The combined data from the sensors may be used by a processor to autonomously (or semi-autonomously) navigate or to assist a driver in navigating the roadway in a variety of light conditions, weather conditions, traffic conditions, load conditions, road conditions, etc. The sensors, mirrors, and other features of the sensor pod 12 are configured and oriented to provide a predetermined field of view and to provide reliable, accurate, and high quality data for autonomous and semi-autonomous driving. The specific sensor placement and the rigidity of the connecting assembly and support structure enable a sufficient field of view while reducing vibrational disturbances and allowing a high object detection rate and high quality positional data.

Figure 3:
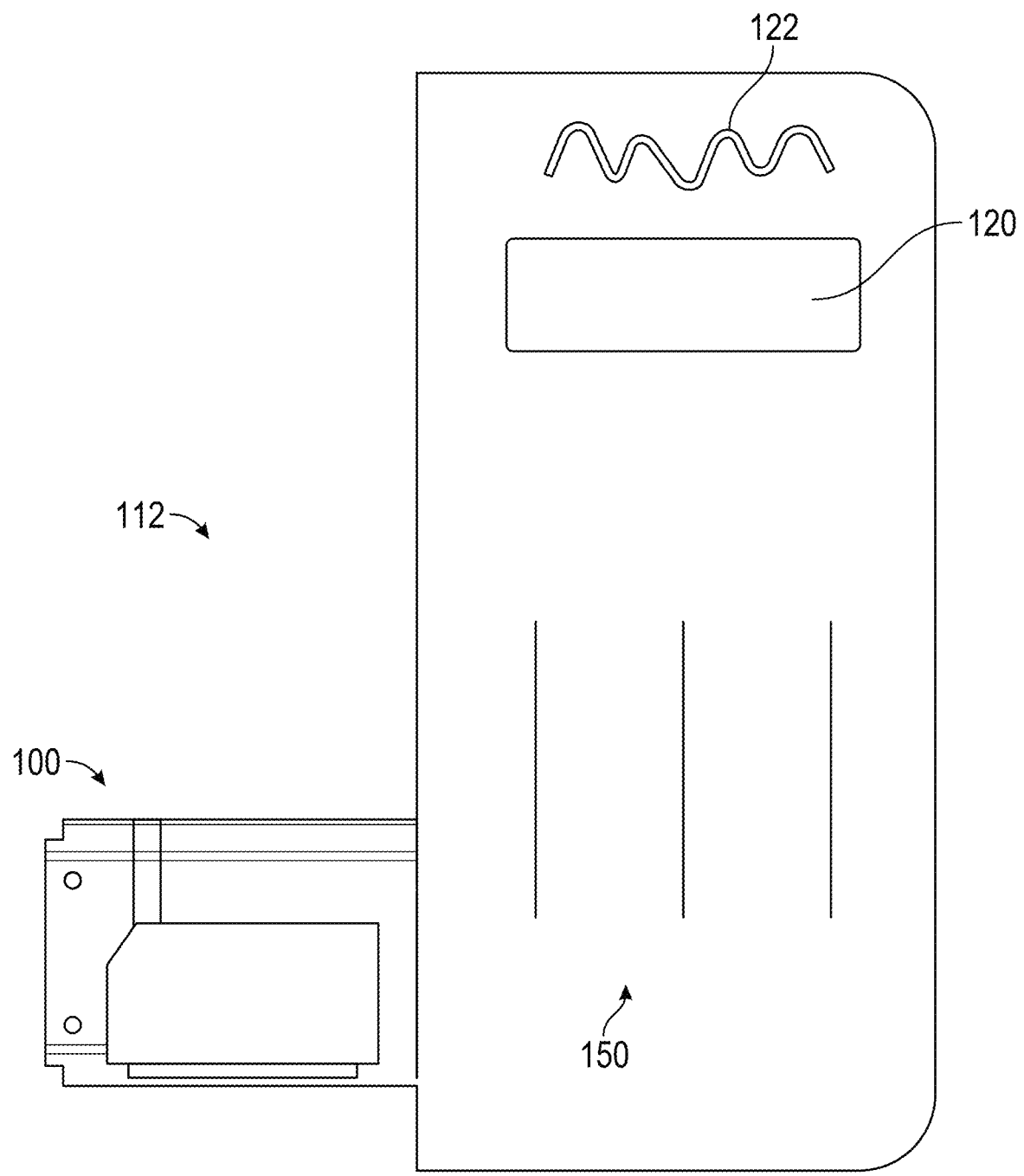
FIG. 3 illustrates a forward side schematic view of a vented sensor pod, according to an embodiment of the present disclosure.

FIG. 3 illustrates a schematic view of a sensor pod 112. The sensor pod 112 may be the same as, or similar to, the sensor pod 12 of FIGS. 1 and 2, with the addition of a vent, as described herein. The sensor pod 112 may be coupled to a vehicle, such as vehicle 10 of FIG. 1 or FIG. 2, with a connecting assembly 100, which may be the same as or similar to the connecting assembly 100 of FIG. 1 and FIG. 2. The sensor pod 112 may include one or more sensors 120. The one or more sensors 120 may be any of the sensors and/or cameras previously described.

The one or more sensors 120 may generate heat 122. The heat 122 may be heat produced by electromechanical processes in the operation of one or more components of the one or more sensors 120. The heat 122 is energy produced from the one or more sensors 120 due to the operation of the one or more sensors 120 or created by inefficiencies that results in loss from the processes in their operation. The heat 122 may be radiated from the one or more sensors 120 in directed or non-directed means. For example, heat sinks may be installed near the sensors to direct heat in specific directions conductively from the sensors for sensors that have high heat generation characteristics. As the heat 122 is radiated from the one or more sensors 120, convection may transport at least a portion of the heat 122 to be trapped or confined within the sensor pod 112. That is, all of the heat energy (e.g., heat 122) produced from operation of the one or more sensors 120 may not exit the sensor pod 112, this may be due to the materials used to construct the sensors 120 and/or the sensor pod 112 and/or may be due to the external atmospheric temperature (e.g., where the temperature differential between an interior of the sensor pod 112 and an exterior of the sensor pod 112 is small, zero, or a negative differential, removal of the heat energy from within the sensor pod 112 may be small or nonexistent). The heat 122 may be viewed as a temperature that is relatively higher as compared to another temperature within the sensor pod 112 (e.g., a temperature of a sensor 120).

Accordingly, the sensor pod 112 may include one or more vents 150 to assist in selectively maintaining or removing the heat 122 from within the sensor pod 112. The one or more vents 150 may be any of the vents described herein and may be located on any single surface or any combination of surfaces of the sensor pod 112. The one or more vents 150 may be controlled and operated in a manner described herein.

Figure 4:
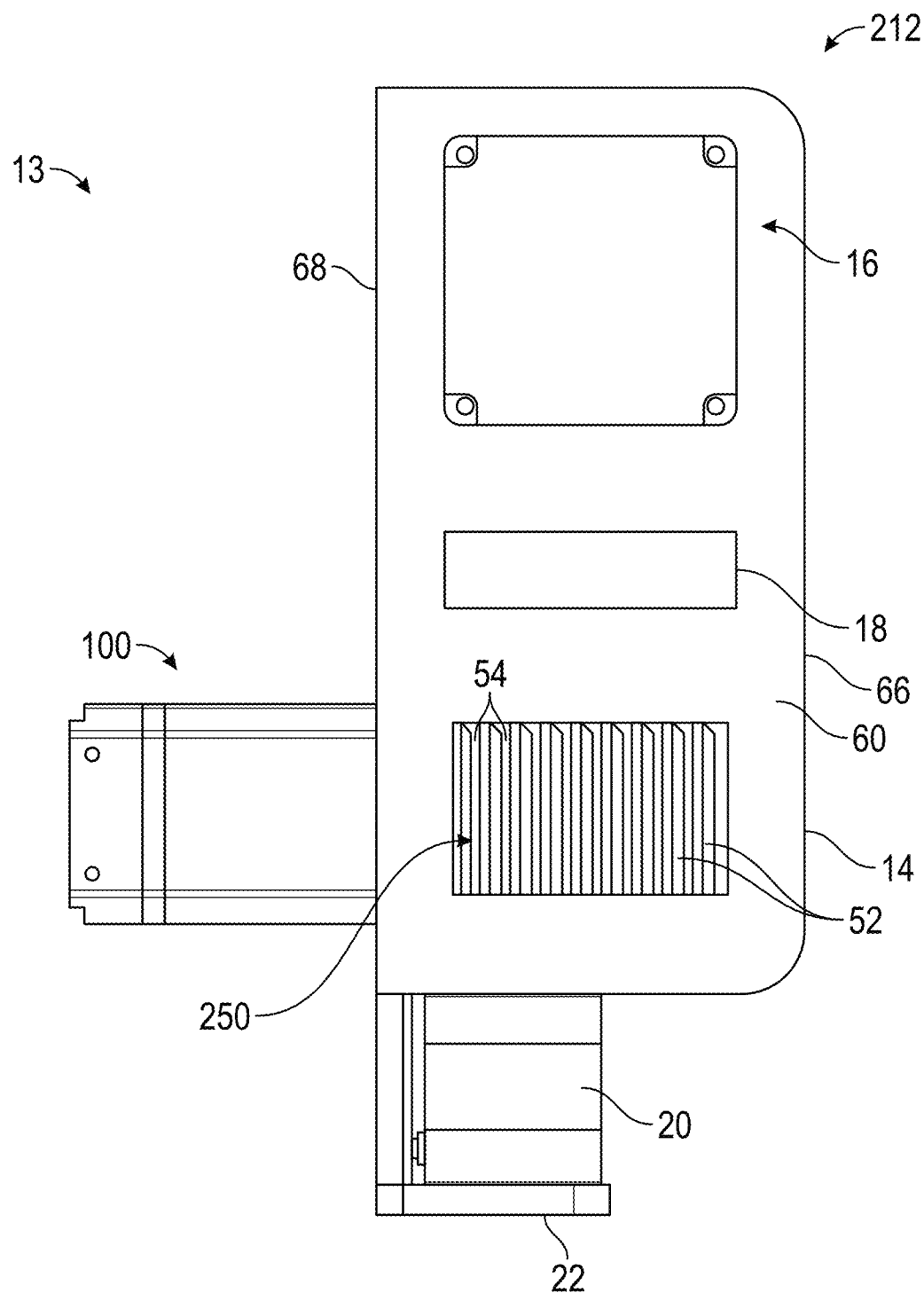
FIG. 4 illustrates a forward side elevational view of another vented sensor pod, according to an embodiment of the present disclosure.

FIG. 4 shows a forward side 13 of a sensor pod 212 and a connecting assembly 100. The sensor pod 212 is an example of the schematic sensor pod 112. The sensor pod 212 may be the same as, or similar to, the sensor pod 12 of FIGS. 1 and 2, with the addition of a vent, as described herein. The sensor pod 212 may be coupled to a vehicle, such as vehicle 10 of FIG. 1 or FIG. 2, with the connecting assembly 100, which may be the same as or similar to the connecting assembly 100 of FIG. 1 and FIG. 2.

With continued reference to FIG. 4, the sensor pod 212 includes a sensor pod housing 14. The sensor pod 212 may be releasably coupled to the vehicle 10 (FIG. 1) such that the sensor pod 212 may be installed, uninstalled, interchanged and/or replaced on the vehicle 10. The sensor pod 212 may be coupled to the vehicle 10 in a manner that allows the sensor pod 12 to be rotated or pivoted with respect to the vehicle 10, such as described in in U.S. application Ser. No. 17/826,000, which is hereby incorporated by reference in its entirety. The sensor pod housing 14 may house at least a portion of the sensors, cameras, mirrors, additional components, etc. required for operation of the sensor pod 212. For example, as shown in FIG. 4, the sensor pod 212 may include one or more sensors (which may align with the one or more sensors 120 of FIG. 3), which may include a radar 16, a camera assembly 18, and a lidar 20. The lidar 20 may be located on a support 22 connected to a lower end of the sensor pod 212. The lidar 20 may be a spinning lidar. A second lidar, such as a scanning lidar, not visible, may be located within the sensor pod housing 14. The radar 16 may be a forward facing lidar. Although not visible in FIG. 4, a rear facing radar may be present on an opposing side of the sensor pod 212. The camera assembly 18 may include a plurality of cameras (not visible in FIG. 4) included in the camera assembly 18 are visible. For example, the camera assembly 18 may include one or more cameras facing the forward side 13, one or more cameras facing the rear side 15, and one or more cameras facing a lateral side perpendicular to the forward side and rear side. In some examples, the camera assembly may include narrow field of view camera(s), thermal camera(s), wide field of view camera(s), side-facing camera(s), and/or e-mirror camera(s). The aforementioned cameras are merely exemplary, and any number or type of cameras may be included to facilitate the autonomous, semi-autonomous, or assisted navigation of the vehicle 10, including, the cameras described in International Patent Application Publication No. WO 2020/180707.

The lidar, the radar, and the camera assembly all provide information and data to autonomously or semi-autonomously operate and navigate the vehicle 10 and/or provide information and data to assist in the navigation of the vehicle 10 where an operator is present inside the cab of the vehicle 10. For example, the lidar may assist in tracking vehicles or objects passing or being passed by the autonomous vehicle. In an example, the radar may enable the autonomous vehicle to navigate in difficult weather and light conditions. The radar may supplement the information from the camera assembly and lidar, which may have difficulty obtaining clear images and signals in the presence of certain weather conditions, such as fog, rain, and snow. The radar may also provide information regarding objects that are occluded in the camera and lidar data. In an example the cameras may track vehicles or objects and assist in tracking of the vehicles or objects.

Each of the lidar, radar, and cameras may generate energy in the form of heat during operation. For example, lidar include a laser to detect objects and vehicles. Operation of the laser generates significant heat within the sensor pod housing 14. The other sensors, cameras, wires, or other components within the sensor pod housing 14 may also generate heat. In order to dissipate or remove this heat from the sensor pod 212, the sensor pod 212 may include a vent 250 on a forward side 60 of the sensor pod housing 14. The vent 250 may be a louvered vent. For example, the vent 250 may include a plurality of slats 52. The plurality of slats 52 may be fixed or connected to the sensor pod housing 14 at regular intervals. A plurality of openings 54 may be located between adjacent slats 52 of the plurality of slats 52. The vent 250 may be controlled between an open position (FIG. 4) to dissipate or remove heat generated within the sensor pod housing 14 and a closed position (not shown) configured to trap or maintain the heat generated within the sensor pod housing 14 inside the sensor pod housing 14. The vent 250 may take any form that allows for an open position and a closed position. That is, although shown as slats 52 with openings 54, other arrangements of vent 250 may be provided.

In the open position of FIG. 4, the plurality of openings 54 between adjacent slats 52 of the plurality of slats 52 may allow flow into and out of the sensor pod housing 14. Thus, heat generated within the sensor pod housing 14 may be permitted to flow (e.g., via convection or air flow) to an external environment that is external of the sensor pod housing 14. The amount of air flow through the vent 250 is adjusted based on the speed of the truck, the position of the vent on the sensor (and thus the orientation of the flow of air from outside the truck into the sensor pod), and the orientation of the slats 52 between the closed and open positions.

In a closed position (not shown), the slats 52 may be adjusted and/or rotated such that the openings 54 are closed by the plurality of slats 52 (e.g., the slates are now touching, such as, for example, touching end to end, prohibiting flow therethrough). In the closed position, no flow is permitted through the vent as the openings 54 are now closed. Some leakage flow may escape through the closed vent 250, however such leakage flow is insufficient to remove the generated heat within the sensor pod housing 14 in a manner that allows for cooling of the interior of the sensor pod housing 14 and/or cooling of the one or more sensors. Thus, heat generated within the sensor pod housing 14 will be maintained or trapped within the sensor pod housing 14. Although some heat may radiate outward (e.g., the thermal motion of the particles may transfer the heat from the sensor pod 212) from the sensor pod 212 and dissipate in that manner, the majority of the heat will be maintained within the sensor pod housing 14. Such a configuration may be desirable in extremely cold environments, where the additional amounts of heat are beneficial in maintaining the nominal operation of the sensors within the sensor pod 212.

In an intermediate position (not shown), the slats 52 may be located at a position between fully open and fully closed. This may allow for the vent 250 to be variably opened and closed to selectively permit flow through the vent 250. Thus, the intermediate position may include a plurality of positions between the fully open position and fully closed position.

Thus, the vent 250 may regulate the internal temperature of the sensor pod 212 based upon the temperature within the sensor pod housing 14 and the external temperature of the environment.

Figure 5:
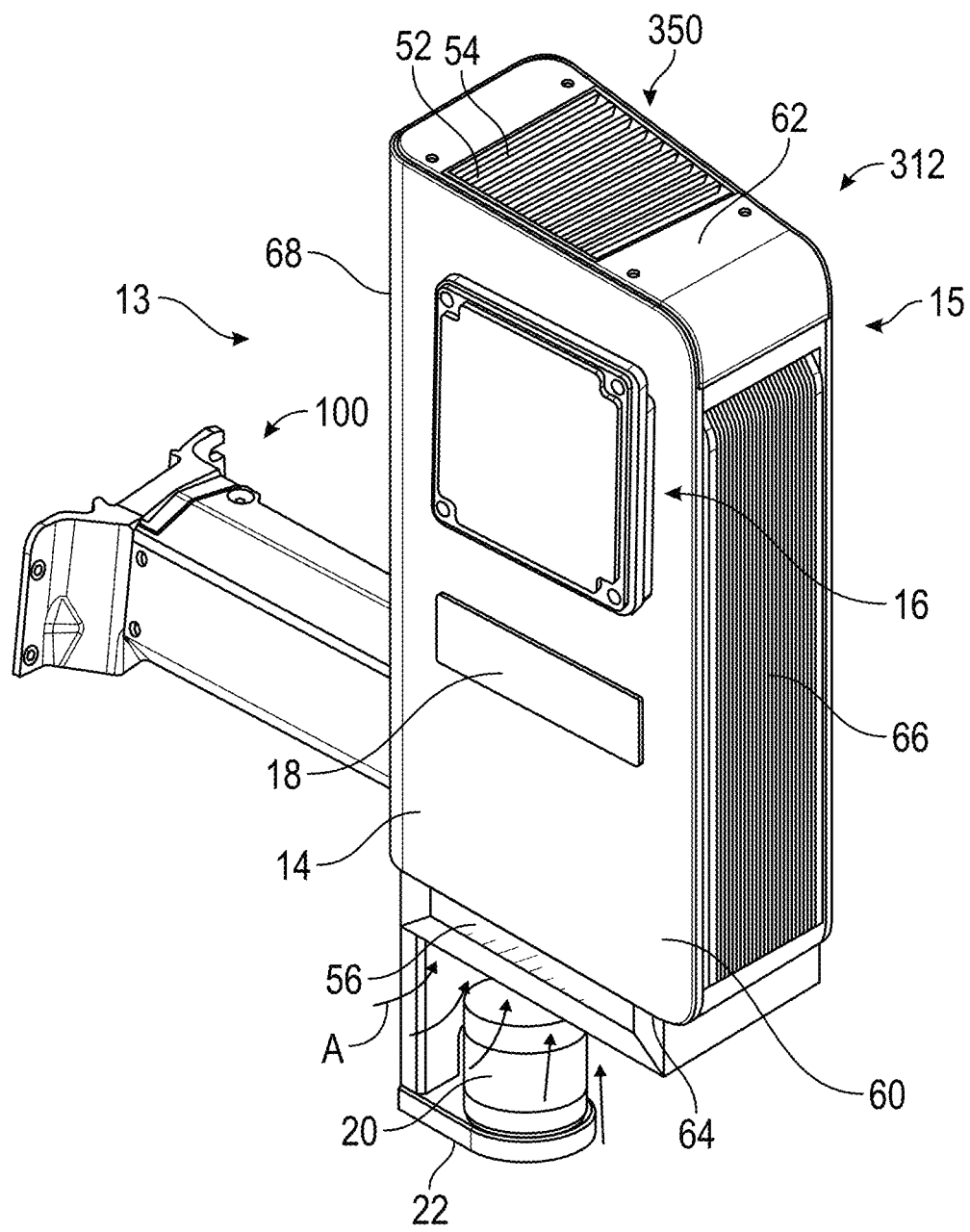
FIG. 5 illustrates a forward side perspective view of another vented sensor pod, according to an embodiment of the present disclosure.

FIG. 5 illustrates an alternative sensor pod 312 having a forward side 13 and a rear side 15. The sensor pod 312 may be the same as the sensor pod 112 of FIG. 3 and/or the sensor pod 212 of FIG. 4, except as noted herein. Thus, components labeled with the same numbering as FIG. 4 represent the same components as described within respect to FIG. 4. In FIG. 5, a vent 350 (which may be the same as the vent 150 or the vent 250 and may operate in the same aforementioned manner) may be located on an upper side 62 of the sensor pod housing 14. Additionally, an intake 56 may be coupled to a lower side 64 of the sensor pod housing 14.

With continued reference to FIG. 5, the intake 56 may operate to permit air flow through the sensor pod housing 14. The intake 56 may be a passage, tube, duct, or other inlet. The intake may be ducted through the sensor pod housing 14 where the duct may exchange heat between the sensors and the air flowing through the duct, or may be open to the inside of the sensor pod housing 14 such that the air through the intake 56 flows directly over the sensors and any sensor housing attached to the sensor. For example, when the vent 350 is open, air may flow into the intake 56, upward through the sensor pod housing 14, and through the openings 54 to the atmosphere/environment around the sensor pod 12. Thus, by locating the vent 350 on the upper side 62 of the sensor pod housing 14 and the intake 56 on the lower side 64 of the sensor pod housing 14, the air flow through the sensor pod 312 may pass many, if not all, of the sensors therein, allowing for cooling of multiple sensors through the same direct airflow pathway. Accordingly, air (which may be cool relative to the interior of the sensor pod housing 14) may be admitted into the sensor pod housing 14 to assist in cooling the sensor pod 312. When the vent 350 is closed, no air may flow through the intake 56 and/or air may enter the intake 56 but does not exit the vent 350. The amount of air flowing through the intake 56 may be selectively controlled such that a desired amount of air and/or flow rate of air may flow through the sensor pod 312 and, thus, through the vent 350.

Although the vent 150 and the vent 250 are shown and described on the forward side 60 of the sensor pod housing 14, the vent 150 and/or the vent 250 may be located on any side of the sensor pod housing 14, including the upper side 62, the lower side 64, the rear side (not visible), the right lateral side 66, the left lateral side 68. In some examples, the vent 150 and/or the vent 250 may extend from one side to another side (e.g., may exist at a corner and/or extending between two sides and a corner). In some examples, multiple vents 150 and/or 250 may be present on the same side of the sensor pod housing 14. In some examples, a vent 150 and/or 250 may be present on multiple sides of the sensor pod housing 14. In some examples, one or more vents 150 and/or 250 may be present on the same side of multiple sides of the sensor pod housing (e.g., two vents 150 and/or 250 on forward side 60 and one vent 150 and/or 250 on the rear side). Similar locations, placements and/or arrangements may be applied to the vent 350 and/or to the intake 56 of FIG. 5. For example, the intake 56 may be located anywhere on the sensor pod housing 14 to allow admittance of air into the sensor pod housing 14. The intake 56 may be located based on the location of the sensors within the sensor pod housing 14. The intake 56 may be located based on access to air flow. Features of FIGS. 3 to 5 may be interchanged or replaced with each other without departing from the scope of the present disclosure.

Accordingly, the sensor pod of the present disclosure is a vented sensor pod. The sensor pod provides for venting through the sensor pod. The sensor pod may selectively allow venting through the sensor pod. The sensor pod may selectively allow air flow into and/or out of the sensor pod. In this manner, when heat builds up in the sensor pod due to the operation of the sensors and equipment therein, the heat may be either maintained in or released from the sensor pod. The maintaining and release may be each be controlled, as will be described herein.

In certain weather conditions, such as, for example, very cold weather (e.g., near freezing or below freezing) or in weather conditions with precipitation/accumulation (e.g., fog, ice, rain, sleet, snow, etc.), the heat accumulating within the sensor pod may be maintained within the sensor pod, in a manner to be described herein. When maintained in the sensor pod, the trapped heat may prevent freezing or reduced operation in the sensors therein, may melt or otherwise dissipate accumulated precipitation on the sensor pod, and in particular, on the sensor cameras themselves, and/or may prevent the accumulation of precipitation on the sensor pod housing, and in particular, on the sensors or cameras themselves.

In certain weather conditions, such as non-freezing or non-near-freezing temperatures, the heat may be released from within the sensor pod, in a manner to be described herein. When released, the heat accumulating within the sensor pod is released (e.g., via a vent) to the environment or atmosphere around the sensor pod housing. This reduces the likelihood and/or prevents the sensors or cameras from overheating due to heat about a predetermined temperature within the sensor pod housing.

Figure 6:
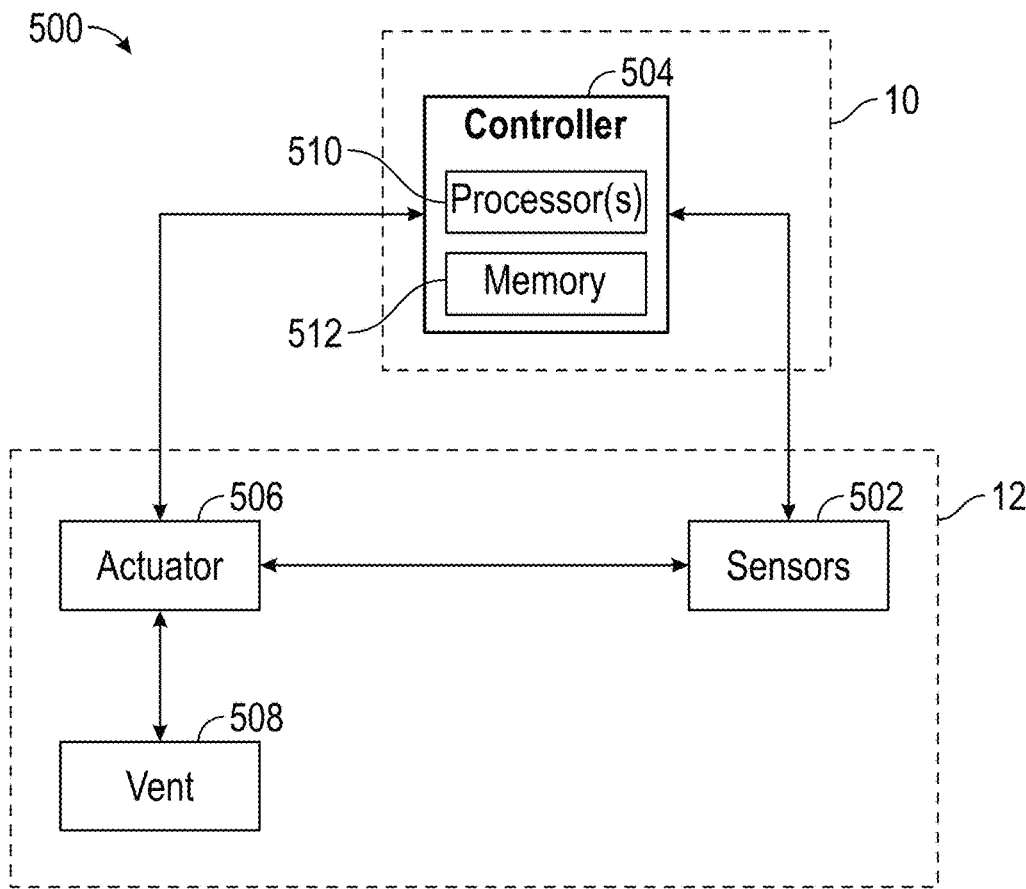
FIG. 6 illustrates a schematic of a vented sensor pod, according to an embodiment of the present disclosure.

Accordingly, and referring to FIG. 6, a vented sensor pod system 500 may include one or more sensors 502, one or more controllers 504, one or more actuators 506, and one or more vents 508. The one or more sensors 502 may include one or more lidar (such as, for example, but not limited to, the spinning lidar 20, the scanning lidar within the sensor pod housing 14, or both), one or more cameras of the camera assembly 18, one or more radar (such as, for example, but not limited to the radar 16 and/or a rear facing lidar on the opposing side of the sensor pod housing 14 from the radar 16), and/or one or more temperature sensors. The sensors 502 may be located on, located within, or otherwise be coupled or connected to the sensor pod 12. The sensor pod 12 may be any of the sensor pods described herein.

The one or more controllers 504 may include a processor 510 and a memory 512. The one or more controllers 504 may include a communication interface to allow two-way communication with the sensors 502 and the actuator 506. In some examples, the controller 504 may communicate with the vent 508 and/or with other components within the sensor pod 12 or the vehicle 10. Although shown as being associated with the vehicle 10, the controller 504 may be associated with the sensor pod 12 and/or the connecting assembly 100 (FIG. 1).

The one or more actuators 506 may allow operation of the one or more vents 508. Where multiple vents 508 are provided, one actuator 506 may be coupled to all of the vents 508 or multiple actuators 506 may be provided such that each actuator 506 is associated with a respective vent 508. The one or more actuators 506 may communicate with the sensors 502, the controller 504, and the vent 508, in a manner to be described. The actuator 506 may be a passive actuator, an active actuator, or may include both a passive and an active actuator. In a nonlimiting example, the actuator 506 may include an electric solenoid actuator, a linear actuator, a pneumatic actuator, an electric actuator, a thermal actuator, a magnetic actuator, a mechanical actuator, a rotary actuator, a hydraulic actuator, a piezoelectric actuator, etc. For example, the actuator 506 may be a material that changes shape, dimension, or condition according to the temperature of the material. In one example, this may be a shape memory alloy.

The vent 508 may be any of the vents described herein, such as, for example vent 150, vent 250, and/or vent 350. The vent 508 may include any of the variations, or any combination of variations, as described with respect to the vent 150, the vent 250, and the vent 350. In addition to a single vent for the entire sensor pod housing, the vents may include a plurality of vents where each sensor may be attached to one actuator for one specific vent configured for the specific sensor, or may include a group of sensors for one actuator and vent or vents.

Figure 7:
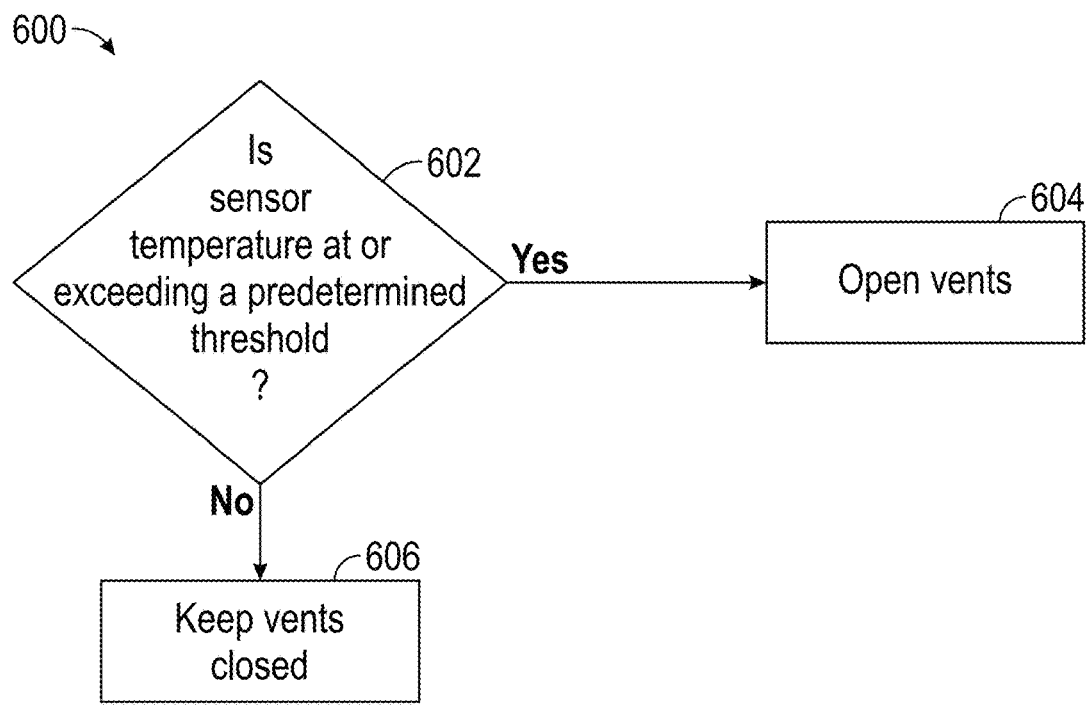
FIG. 7 illustrates a process for operating a vent of a sensor pod, according to an embodiment of the present disclosure.
Figure 8:
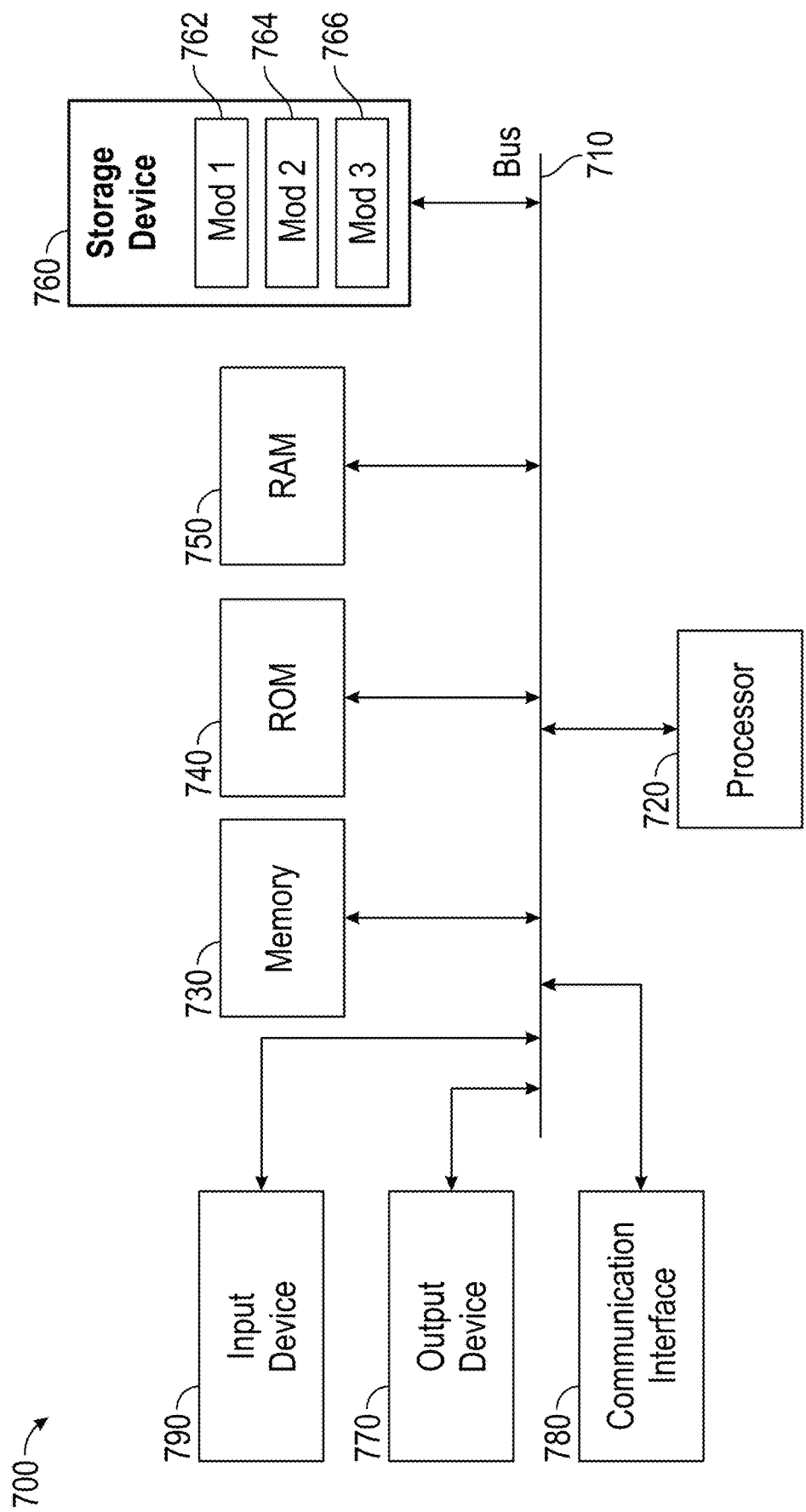
FIG. 8 illustrates a computer system, according to an embodiment of the present disclosure.

During operation, and referring to FIGS. 6 and 7, the sensors 502 generate heat. For example, the electrical components of the sensors, and in the case of the lidar, the lasers, may generate heat when the sensors 502 are operating. Heat may also be generated when the sensors 502 are in an on/standby condition, but are not actively performing any functionality and/or information gathering. This heat is radiated from the sensors 502. According to the method 600 of FIG. 6, the controller 504 may interrogate, at step 602, either continuously or at predetermined time intervals, each of the sensors 502 to determine a temperature of the respective sensor 502. In cases where the sensor 502 is one of the sensors for operating the autonomous truck 10, the temperature may be a temperature of the sensor 502 itself. In cases where the sensor is a temperature sensor, the temperature may be an internal temperature of the sensor pod housing 14 (FIG. 3). Accordingly, the predetermined temperature at which the vent is opened and/or closed, may be the temperature of the sensor 502, may be the temperature within the sensor pod housing 14, may be a temperature difference between the external atmosphere (e.g., the exterior ambient air temperature) and the internal sensor pod housing temperature or sensor 502 temperature, or a combination thereof. The controller 504 may include programming or algorithms to change the predetermined temperature at which the vents are opened based on other factors, such as, for example, atmospheric temperatures, internal temperatures, operation status of the vehicle, operation status of the sensor pod, etc.

At step 604, if the temperature is above a predetermined temperature, one or more of the vents 508 may be opened from a closed position and/or may be maintained open if already in the open position. The controller may actuate (via the one or more actuators 506) all of the vents 508 or may actuate (via the one or more actuators 506) only a portion of the vents 508. In some examples, all of the vents 508 are actuated simultaneously. In some examples, all of the vents 508 are actuated sequentially or in a predetermined pattern. In some examples, only vents 508 in predetermined areas of the sensor pod 12 are actuated. For example, if heat is being released to cool the sensors 502, the vents 508 near the overheated sensors 502 may be opened and/or sensors in other portions of the sensor pod housing 14 may be opened to allow for air to be pulled through the sensor pod housing 14 to pull the heat away from the overheated sensors 502. The differential pressure created by opening the vents 508 will cause air from within the sensor pod housing 14 to be pulled through and out of the sensor pod housing 14. Any combination of vents 508 in any pattern may be opened based on the detected temperatures within the sensor pod housing 14. The controller 504 may include programming or algorithms to control the order, number, and location of the vents 508 being opened.

During operation, the actuators 506 may receive a signal from the controller 504 indicating that the vent 508 associated with the respective actuator 506 is to be opened. At this point, the actuator 506 may receive the control signal to open the vent 508. The actuator 506 may then operate the slats 52 (FIG. 3) on the vent 508 to open, either entirely or to a predetermined angle. After a predetermined time period, or after the temperature has fallen below the predetermined threshold, the actuator 506 may receive a control signal from the controller 504 to close the vent 508. In some examples, the control signal may come from the sensor 502 itself. For example, where the actuator 506 is a passive actuator, the state of the sensor 502 (e.g., the temperature of the sensor 502) may automatically actuate the actuator 506 to open the vent 508. For example, the actuator 506 may be a material that changes shape or condition based on temperature. Thus, the actuator 506 may be constructed such that at the predetermined temperature of the sensor 502, the actuator 506 changes shape (e.g., constricts or extends) to open the vent 508. In this manner, the vent 508 automatically is opened when the temperature of the sensor 502 reaches a predetermined temperature. When the temperature of the sensor 502 falls below the predetermined temperature, the actuator 506 may revert back to the original shape, or near to the original shape, thus closing the vent 508.

At step 606, if the temperature is below the predetermined temperature, the vent 508 may be kept closed, or if the vents were previously opened, the actuator 506 may close the vents 508. The actuator 506 may operate to close the vent 508 in the same manner as described with respect to opening the vent 508. In both steps 606 and 604, the vents 508 may be operated to partially close or partially open based on a program or algorithm within the controller 504. Partially opening and/or partially closing the vent 508 may allow for heat and/or air to be metered into or out of the sensor pod housing 14 based on the desired amount of heat to be released and/or maintained within the sensor pod housing 14.

In some examples, however, the vent 508 may be closed or maintained closed such that the temperature is maintained at or increase above the predetermined threshold temperature. Such a condition may be desired where melting or removing accumulation from the sensor pod is desired. Once an indication that the accumulation is removed or that the weather condition has passed, the vent 508 may be opened to release the heat and bring the sensor pod back below the predetermined threshold temperature.

In some examples, the predetermined threshold temperature may be altered based on a desired function of the vents, based on an ambient external air temperature, based on forecasted weather, etc., or combinations thereof. For example, in hot ambient air temperatures (e.g., temperatures above 80 degrees Fahrenheit), the predetermined threshold temperature may be set lower than in very cold ambient air temperatures (e.g., freezing or near freezing temperatures). Thus, the vents 508 may be operated differently in hot temperatures than in cold temperatures. This is due to the fact that in cold temperatures, excess heat may be desired to be maintained in the sensor pod housing 14 to provide a melting or thawing function to keep the sensors clear of precipitation or ice/fog build. While in hot temperatures, the risk of overheating may be greater and thus earlier venting may be desired than in cold temperatures.

Accordingly, the vented sensor pod system 500 may be an Internet of Things (IoT) system that compiles information from a variety of sources (e.g., the sensor pod, weather forecasts, traffic data, vehicle operation data, etc.) to set the predetermined threshold temperature. Therefore, the predetermined threshold temperature is selected based on a desired function of the sensor pod 12 and/or the vents 508 and may be changed by the controller and/or by a user. Some factors that may be factored into the predetermined temperature threshold and/or may separately control the vents may include any of the following, but are not limited to, the appearance of the camera being covered or obscured, a signal that snow or ice is building up on the sensor pod, a weather report that there is snow in the area, a signal from one or more nearby trucks that snow or precipitation is occurring, etc. The system may also be actuated before it is needed, e.g., before snow or ice begins to accumulate.

With reference to FIG. 7, an exemplary system includes a general-purpose computing device 700, including a processing unit (CPU or processor) 720 and a system bus 710 that couples various system components including the system memory 730 such as read-only memory (ROM) 740 and random access memory (RAM) 750 to the processor 720. The computing device 700 can include a cache of high-speed memory connected directly with, in close proximity to, or integrated as part of the processor 720. The computing device 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general-purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, system bus 710, output device 770, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 700 is a small, handheld computing device, a desktop computer, or a computer server.

Although the exemplary embodiment described herein employs the hard disk 760, other types of computer-readable media which can store data that are accessible by a computer, such as magnetic cassettes, flash memory cards, digital versatile disks, cartridges, random access memories (RAMs) 750, and read-only memory (ROM) 740, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art, such as, for example, a display. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Accordingly, the systems and methods of the present disclosure address anticipated problems with the sensor pod due to ice/snow build up by harnessing the advances of the sensors building up heat. The systems and methods of the present disclosure capture the heat, when needed, and use the heat to keep ice/snow off of the sensor pod. This allows for the elimination of or omission of separate heater elements within the sensor pod and/or attached to the sensor pod. The systems and methods of the present disclosure allow for harnessing the heat in certain weather conditions and also releasing the heat in other weather conditions. Thus, the systems and methods of the present disclosure are able to be used in cold days and hot days alike.

The systems and methods of the present disclosure balance pulling in air flow versus where in heat is generated in the sensor pod. The vents and intakes of the present disclosure may be arranged on the sensor pod to minimize the negative affects to the sensor pod, for example, by minimizing the amount of drag added to the sensor pod. The vents and/or intakes may have low profiles to minimize the amount of drag and reduce the drag area of the vent and/or intake. The actuators of the present disclosure may control, such as electronically control, the flaps or slats to open and/or close the vent, either entirely or partially. The actuators may operate based on an internal temperature of the sensor pod housing. The vents of the present disclosure may be partially open/partially closed at different predetermined temperature thresholds. In some examples, passive or active actuators may be employed. For example, when a passive actuator is employed, when the actuator is heated, the vent may be controlled to open or be maintained open, when the actuator is cooled or not heated, the vent may be controlled to close or be maintained closed. The vents described herein may be oriented, directed, and/or controlled in a manner that takes advantage of the direction of air flow relative to the driving direction of the vehicle.

Further aspects of the present disclosure are provided by the subject matter of the following clauses.

A vented sensor pod system includes a sensor pod housing, one or more sensors located within the sensor pod housing, and one or more vents coupled to the sensor pod housing, the vent configured to selectively release or maintain heat within the sensor pod housing.

The vented sensor pod system of the preceding clause, wherein the one or more sensors include one or more lidars, one or more radars, one or more cameras, one or more temperature sensors, or any combination thereof.

The vented sensor pod system of any preceding clause, wherein the sensor pod housing has a plurality of sides, and wherein the one or more vents is located on at least one side of the plurality of sides.

The vented sensor pod system of any preceding clause, wherein at least one of the one or more vents is located on a forward side of the sensor pod housing.

The vented sensor pod system of any preceding clause, wherein at least one of the one or more vents is located on an upper side of the sensor pod housing.

The vented sensor pod system of any preceding clause, further including an intake located on a lower side of the sensor pod housing.

The vented sensor pod system of any preceding clause, wherein each of the one or more vents includes a plurality of slats and a plurality of openings between adjacent slats of the plurality of slats.

The vented sensor pod system of any preceding clause, further including an intake configured to selectively permit air to enter the sensor pod housing.

The vented sensor pod system of any preceding clause, wherein the one or more vents is low profile to minimize a drag effect.

The vented sensor pod system of any preceding clause, further including an actuator, wherein the actuator is configured to selectively open or close the one or more vents.

The vented sensor pod system of any preceding clause, wherein the actuator is a passive actuator, the passive actuator configured to actuate the one or more vents due to a temperature of the one or more sensors.

The vented sensor pod system of any preceding clause, wherein the actuator is an active actuator, the active actuator configured to actuate the one or more vents based on a control signal from a controller.

The vented sensor pod system of any preceding clause, wherein the one or more vents are configured to be open above a predetermined threshold temperature and configured to be closed below the predetermined threshold temperature.

The vented sensor pod system of any preceding clause, wherein the one or more vents are movable among an open position, a closed position, and one or more intermediate positions.

The vented sensor pod system of any preceding clause, wherein releasing heat from the sensor pod includes cooling an interior of the sensor pod housing.

A vented sensor pod system including a sensor pod, and a vent configured to provide a predetermined temperature within the sensor pod, the vent having an open position, a closed position, and one or more intermediate positions.

The vented sensor pod system of any preceding clause, wherein the vent is configured to open to reduce a temperature within the sensor pod to at or below the predetermined temperature.

The vented sensor pod system of any preceding clause, wherein the vent is configured to close to maintain a temperature within the sensor pod at or above the predetermined temperature.

The vented sensor pod system of any preceding clause, wherein the vent is in the open position or one of the one or more intermediate positions to release a buildup of heat within the sensor pod.

The vented sensor pod system of any preceding clause, wherein the release of the buildup of heat prevents one or more sensors within the sensor pod from overheating.

The vented sensor pod system of any preceding clause, wherein the vent is in the closed position or one of the one or more intermediate positions to retain a buildup of heat within the sensor pod.

The vented sensor pod system of any preceding clause, wherein the buildup of heat thaws the sensor pod, thaws accumulation on the sensor pod, prevents accumulation on the sensor pod, or any combination thereof.

The vented sensor pod system of any preceding clause, further including a controller configured to set the predetermined temperature.

The vented sensor pod system of any preceding clause, wherein the predetermined temperature is based on a current condition of the sensor pod, an anticipated future condition of the sensor pod, a current weather condition, an anticipated future weather condition, information from another vehicle, information from one or more sensors of the sensor pod, traffic information, or any combination thereof.

The vented sensor pod system of any preceding clause, wherein the predetermined temperature is configured to be changed.

The vented sensor pod system of any preceding clause, wherein the predetermined temperature is set to a greater value when an external ambient air temperature is higher relative to lower external ambient air temperature.

The vented sensor pod system of any preceding clause, further including an actuator configured to move the vent between the open position, the closed position, and the one or more intermediate positions.

The vented sensor pod system of any preceding clause, wherein the actuator is an electric solenoid actuator, a linear actuator, a pneumatic actuator, an electric actuator, a thermal actuator, a magnetic actuator, a mechanical actuator, a rotary actuator, a hydraulic actuator, a shape memory alloy, or a piezoelectric actuator.

A method of regulating a temperature of a sensor pod on an autonomous vehicle, the method including determining a temperature of the sensor pod, determining an amount a vent should be opened based upon the operational status of the autonomous vehicle, an internal temperature of the sensor pod, and ambient temperature of the environment, opening a vent when the temperature is above a predetermined threshold temperature, and closing the vent when the temperature is below the predetermined threshold temperature.

The method of the preceding clause, further including locating the vent in a sensor pod housing of the sensor pod.

The method of any preceding clause, further including maintaining the vent in an open position until the temperature is at or below the predetermined threshold temperature.

The method of any preceding clause, further including passively actuating the vent to open and close.

The method of any preceding clause, wherein passively actuating the vent includes changing a shape, dimension, or condition to actuate the vent.

The method of any preceding clause, further including actively actuating the vent to open and close.

The method of any preceding clause, wherein actively actuating the vent includes sending a control signal to the actuator from a controller.

The method of any preceding clause, further including setting the predetermined threshold temperature based on a current condition of the sensor pod, an anticipated future condition of the sensor pod, a current weather condition, an anticipated future weather condition, information from another vehicle, information from one or more sensors of the sensor pod, traffic information, or any combination thereof.

The method of any preceding clause, further including one or more sensors located within the sensor pod, the predetermined threshold temperature being a temperature of at least one of the one or more sensors.

The method of any preceding clause, wherein the predetermined threshold temperature is an internal temperature of the sensor pod.

The method of any preceding clause, further including admitting air to the sensor pod through an intake when the vent is open.

The method of any preceding clause, further including moving the vent to an intermediate position between open and closed.

The method of any preceding clause, further including releasing heat from the sensor pod when opening the vent.

The method of any preceding clause, further including preventing one or more sensors from overheating by releasing heat from the sensor pod.

A method of clearing an occlusion from a sensor pod including generating heat within the sensor pod, trapping the heat within the sensor pod, and clearing the occlusion from the sensor pod with the trapped heat.

The method of any preceding clause, further including generating heat from operation of a sensor within the sensor pod.

The method of any preceding clause, further including trapping the heat by closing or maintaining closed a vent on the sensor pod.

The method of any preceding clause, further including clearing the occlusion by melting the occlusion or heating a surface of the sensor pod.

The method of any preceding clause, wherein trapping the heat includes maintaining a vent closed when a temperature within the sensor pod is a predetermined threshold temperature.

The method of any preceding clause, further including releasing the heat when the occlusion is cleared.

The method of any preceding clause, further including continuing to trap the heat after the occlusion is cleared in anticipation of another occlusion.

The method of any preceding clause, wherein trapping the heat includes retaining a buildup of heat generated from sensors within the sensor pod to thaw the sensor pod, thaw accumulation on the sensor pod, prevent accumulation on the sensor pod, or any combination thereof.

The method of any preceding clause, wherein trapping the heat occurs based on a current condition of the sensor pod, an anticipated future condition of the sensor pod, a current weather condition, an anticipated future weather condition, information from another vehicle, information from one or more sensors of the sensor pod, traffic information, or any combination thereof.

The method of any preceding clause, further including trapping the heat when the sensor pod is at a predetermined threshold temperature.

The method of any preceding clause, wherein the predetermined threshold temperature is an internal temperature of the sensor pod.

The method of any preceding clause, wherein the predetermined threshold temperature is a difference between an ambient air temperature and an internal temperature of the sensor pod.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:

1. A method of regulating a temperature of a sensor pod on an autonomous vehicle, the method comprising:
   determining the temperature of the sensor pod;
   determining an amount a vent should be opened based upon an operational status of the autonomous vehicle, the temperature of the sensor pod, and ambient temperature of the environment;
   opening the vent when the temperature of the sensor pod is above a predetermined threshold temperature; and
   closing the vent when the temperature of the sensor pod is below the predetermined threshold temperature.

2. The method of claim 1, further comprising locating the vent in a sensor pod housing of the sensor pod.

3. The method of claim 1, further comprising maintaining the vent in an open position until the temperature is at or below the predetermined threshold temperature.

4. The method of claim 1, further comprising passively actuating the vent to open and close.

5. The method of claim 4, wherein passively actuating the vent comprises changing a shape of an actuator, a dimension of the actuator, or a condition of the actuator to actuate the vent.

6. The method of claim 1, further comprising actively actuating the vent to open and close.

7. The method of claim 6, wherein actively actuating the vent comprises sending a control signal to the actuator from a controller.

8. The method of claim 1, further comprising setting the predetermined threshold temperature based on a current condition of the sensor pod, an anticipated future condition of the sensor pod, a current weather condition, an anticipated future weather condition, information from another vehicle, information from one or more sensors of the sensor pod, traffic information, or any combination thereof.

9. The method of claim 1, further comprising one or more sensors located within the sensor pod, the predetermined threshold temperature being a temperature of at least one of the one or more sensors.

10. The method of claim 1, wherein the predetermined threshold temperature is temperature of the sensor pod.

11. The method of claim 1, further comprising admitting air to the sensor pod through an intake when the vent is open.

12. The method of claim 1, further comprising moving the vent to an intermediate position between open and closed.

13. The method of claim 1, further comprising releasing heat from the sensor pod when opening the vent.

14. The method of claim 1, further comprising preventing one or more sensors of the sensor pod from overheating by releasing heat from the sensor pod.

15. A method of clearing an occlusion from a sensor pod, the method comprising:
 generating heat within the sensor pod;
 trapping the heat within the sensor pod by closing or maintaining closed a vent on the sensor pod; and
 clearing the occlusion from the sensor pod with the trapped heat.

16. The method of claim 15, further comprising generating heat from operation of a sensor within the sensor pod.

17. The method of claim 15, further comprising clearing the occlusion by melting the occlusion or heating a surface of the sensor pod.

18. The method of claim 15, wherein trapping the heat comprises maintaining a vent closed when a temperature within the sensor pod is a predetermined threshold temperature.

19. The method of claim 15, further comprising releasing the heat when the occlusion is cleared.

20. The method of claim 15, further comprising continuing to trap the heat after the occlusion is cleared in anticipation of another occlusion.

21. The method of claim 15, wherein trapping the heat includes retaining a buildup of heat generated from sensors within the sensor pod to thaw the sensor pod, thaw accumulation on the sensor pod, prevent accumulation on the sensor pod, or any combination thereof.

* * * * *